US012629689B2

(12) United States Patent
Urquhart

(10) Patent No.: US 12,629,689 B2
(45) Date of Patent: May 19, 2026

(54) CONTAINER UNIT, APPARATUS FOR MANAGING CONTAINERS AND METHOD FOR MANAGING CONTAINERS

(71) Applicant: NUOVA OMPI S.R.L., Piombino Dese (IT)

(72) Inventor: Tod Urquhart, Piombino Dese (IT)

(73) Assignee: NUOVA OMPI S.R.L., Piombino Dese (IT)

( * ) Notice: Subject to any disclaimer, the term of this patent is extended or adjusted under 35 U.S.C. 154(b) by 264 days.

(21) Appl. No.: 18/258,090

(22) PCT Filed: Jan. 20, 2022

(86) PCT No.: PCT/EP2022/051179
§ 371 (c)(1),
(2) Date: Jun. 16, 2023

(87) PCT Pub. No.: WO2022/157220
PCT Pub. Date: Jul. 28, 2022

(65) Prior Publication Data
US 2024/0033742 A1 Feb. 1, 2024

(30) Foreign Application Priority Data
Jan. 22, 2021 (IT) ........................ 102021000001130

(51) Int. Cl.
*B01L 9/06* (2006.01)
*B01L 3/00* (2006.01)
*G01N 35/00* (2006.01)

(52) U.S. Cl.
CPC .................. *B01L 9/06* (2013.01); *B01L 3/545* (2013.01); *B01L 3/5453* (2013.01);
(Continued)

(58) Field of Classification Search
CPC .......... B01L 9/06; B01L 3/545; B01L 3/5453; B01L 2200/185; B01L 2300/021;
(Continued)

(56) References Cited

U.S. PATENT DOCUMENTS 5,663,545 A    9/1997 Marquiss
6,148,291 A  * 11/2000 Radican ............... G06Q 10/087
705/28
(Continued)

FOREIGN PATENT DOCUMENTS

CN        1739856 A  *  3/2006  ............... B01L 9/06
CN     103250056 A     8/2013
(Continued)

OTHER PUBLICATIONS

CN-1739856-A, English Translation (Year: 2006).*
(Continued)

*Primary Examiner* — Ryan D Walsh
(74) *Attorney, Agent, or Firm* — Husch Blackwell LLP

(57) ABSTRACT

A container unit for handling containers includes a support surface arranged with a plurality of seats. Each of said sets is adapted to contain a container, and each container is provided with a container data carrier adapted to contain a unique identifier of the container. The container unit comprises at least one container unit data carrier adapted to contain data of the containers contained in the seats, said data comprising the unique identifiers of each container, and the position of each container in the seats. A nest locator is provided on the surface of the container unit. The nest locator is adapted to be the reference for mapping the position of the containers in the seats.

19 Claims, 4 Drawing Sheets

(52) U.S. Cl.
CPC ... *B01L 2200/185* (2013.01); *B01L 2300/021* (2013.01); *B01L 2300/022* (2013.01); *B01L 2300/023* (2013.01); *B01L 2300/024* (2013.01); *G01N 2035/00742* (2013.01); *G01N 2035/00801* (2013.01)

(58) Field of Classification Search
CPC ......... B01L 2300/022; B01L 2300/023; B01L 2300/024; G01N 2035/00742; G01N 2035/00801
See application file for complete search history.

(56) References Cited

U.S. PATENT DOCUMENTS

| | | | | |
|---|---|---|---|---|
| 8,028,843 | B2 * | 10/2011 | Guzman | B01L 9/06 |
| | | | | 211/85.18 |
| 2005/0142033 | A1 * | 6/2005 | Glezer | B01L 3/5085 |
| | | | | 422/400 |
| 2006/0051239 | A1 | 3/2006 | Massaro | |
| 2007/0145150 | A1 * | 6/2007 | Barczyk | G09F 3/04 |
| | | | | 235/492 |
| 2007/0200701 | A1 | 8/2007 | English et al. | |
| 2010/0182150 | A1 | 7/2010 | Edelstain | |
| 2012/0025988 | A1 * | 2/2012 | Harada | H04B 5/26 |
| | | | | 340/572.1 |
| 2012/0100557 | A1 * | 4/2012 | Fox | G01N 1/30 |
| | | | | 435/7.1 |
| 2012/0118954 | A1 | 5/2012 | Hagen et al. | |
| 2013/0027185 | A1 * | 1/2013 | Lavi | B01L 9/06 |
| | | | | 340/10.1 |
| 2014/0110480 | A1 * | 4/2014 | Burri | B01L 9/06 |
| | | | | 235/385 |
| 2018/0057249 | A1 * | 3/2018 | Bertolin | B65D 71/70 |
| 2019/0234974 | A1 | 8/2019 | Wiederin et al. | |
| 2021/0270859 | A1 * | 9/2021 | Ferrara | G01N 1/14 |
| 2021/0311084 | A1 * | 10/2021 | Rodoni | B01L 9/06 |

FOREIGN PATENT DOCUMENTS

| | | | | | |
|---|---|---|---|---|---|
| EP | 2431928 | A1 * | 3/2012 | ............. | B01L 3/545 |
| EP | 3231467 | A1 * | 10/2017 | ........... | A61M 5/142 |
| EP | 4024276 | A1 * | 7/2022 | .......... | G06K 19/083 |
| JP | 2005077354 | A | 3/2005 | | |
| JP | 2012189379 | A | 10/2012 | | |
| JP | 5354509 | B1 * | 11/2013 | | |
| JP | 2014085349 | A | 5/2014 | | |
| JP | 2014190864 | A | 10/2014 | | |
| JP | 2019213625 | A | 12/2019 | | |
| WO | WO-2013050849 | A1 * | 4/2013 | ............... | B01L 9/06 |
| WO | WO-2013170204 | A1 * | 11/2013 | ............ | G06F 3/147 |
| WO | 2017157784 | A1 | 9/2017 | | |
| WO | WO-2019081345 | A1 * | 5/2019 | ............... | B01L 9/06 |
| WO | WO-2021102043 | A1 * | 5/2021 | .......... | G01N 35/026 |

OTHER PUBLICATIONS

EP-2431928-A1, English Translation (Year: 2012).*
EP-3231467-A1, English Translation (Year: 2017).*
EP-4024276-A1, English Translation (Year: 2022).*
JP-5354509-B1, English Translation (Year: 2013).*
WO-2013050849-A1, English Translation (Year: 2013).*
WO-2013170204-A1, English Translation (Year: 2013).*
WO-2019081345-A1, English Translation (Year: 2019).*
WO-2021102043-A1, English Translation (Year: 2021).*
Office Action dated Nov. 11, 2025 for Chinese Application No. 202280007467.1.
Office Action dated Nov. 27, 2025 for Japanese Application No. 2023-520203.
An Investigation into Digital Image Processing and Implementation Methods—Publication Date Aug. 31, 2018—By Huang Lisha, Beijing: Beijing University of Technology Press—pp. 205-206.

* cited by examiner

CONTAINER UNIT, APPARATUS FOR MANAGING CONTAINERS AND METHOD FOR MANAGING CONTAINERS

CROSS REFERENCE

This application is a U.S. National Phase Application of International Application No. PCT/EP2022/051179 filed on Jan. 20, 2022, which in turn claims priority to Italian Application No. 102021000001130 filed on Jan. 22, 2021, the disclosures of which are incorporated herein by reference in their entireties.

TECHNICAL FIELD

The present disclosure concerns a container unit, an apparatus for managing containers, and a method for managing containers. In particular, the present disclosure relates to a container unit adapted to contain primary containers for pharmaceutical or veterinary use, and an apparatus and a method for managing primary containers for pharmaceutical or veterinary use.

BACKGROUND

As is known, primary containers for pharmaceutical or veterinary use are moved in bulk or are aggregated, in a ready to use state where the containers have been aggregated and sterilized. For this purpose, primary containers are placed in a secondary container, wherein the primary containers are placed separated and next to each other.

In the present description and in the attached claims, the term "primary container" is meant to indicate containers made of glass or polymer, such as, but not exclusively, vials and cartridges with or without a closure system and syringes both with or without a needle shield, a needle safety device or a luer lock cap.

In the present discussion specific reference will be made to containers for pharmaceutical and veterinary use, however, the principles of the present disclosure can be applied in the same way also to other fields, as will become obvious to those skilled in the art. Moreover, the present disclosure is not related to a specific type, size, or shape of a glass container.

It is known to aggregate the primary containers in a so-called nest and tub configuration, wherein the primary containers are arranged in a nest and the nest is in turn arranged inside a tub.

This configuration is particularly adapted to handle the primary containers throughout the various operations to which the primary containers are subjected, such as treatment step (filling, capping, manual or automated inspection operations) or for performing various combination, washing, sterilization, inspection operations, etc.

In these types of operations, it is important to create a complete traceability of the origin of each container.

It is known in the prior art the serialization concept, namely to apply to the primary container a machine or human readable code in order to provide a unique identity to the primary container, in the same way as a fingerprint.

As an example, the readable code marking of the containers can be marked on the container, by means of a printing unit, which is able to print a specific mark on each container.

Besides the serialization concept, it is known in the packaging field to apply an aggregation concept, which is used to create a "parent and child" relationship between different packaging levels, in order to simplify the management of the process in the supply chain.

As an example, a pallet can have a unique identifier, two shipper (children), and each shipper can have two tubs (children of shipper). Therefore, in this example, the aggregation of unique identifier comprises seven unique identifiers in three "parent and child" levels.

In this way, by means of a scanning of one of the readable code, it is possible to provide the identity of the parents and children of all the levels.

Although the systems of the prior art are widely used and appreciated, they are not devoid of drawbacks.

First of all, the systems used by the prior art do not permit to overcome the challenges connected to the orientation of the nest in the tub. As a matter of fact, a nest may contain a plurality of containers in specific positions. Therefore, the automatic systems have to locate the machine-readable code of each container to map the location and orientation of each container.

Furthermore, the readability of the machine-readable code of each container is not so simple, in view of the possible orientation of the container in the nest.

SUMMARY

The object of the present disclosure is therefore to solve at least some of the drawbacks and limitations cited with reference to the prior art.

A first task of the present disclosure is to simplify the readability of the machine-readable code of the containers, in particular in the filling machine.

A second task is to overcome the machine nest orientation challenges mentioned above.

Another task is to improve the ability to pass product and supplier data to the filling machine/line to increase product traceability.

According to one aspect of the present disclosure, there is provided a container unit for handling containers that includes a support surface arranged with a plurality of seats, each of said seats being adapted to contain a container, each container being provided with a container data carrier adapted to contain a unique identifier of the container; at least one container unit data carrier adapted to contain data of the containers contained in the seats, said data comprising the unique identifiers of each container, and the position of each container in the seats; a nest locator provided on the surface of the container unit and adapted to be the reference for mapping the position of the containers in the seats.

According to another aspect of the present disclosure, there is provided an apparatus for managing containers that includes a container unit as described herein; a reading device adapted to read the data contained in said container unit data carrier; and a computerized control system operatively connected to said reading device and adapted to receive the data of said container unit data carrier from said reading device.

According to yet another aspect of the present disclosure, there is provided a method for managing containers with an apparatus for managing containers as described herein that includes the steps of providing the apparatus with a container unit comprising a support element provided with the support surface; scanning the container data carrier of each container contained in the container unit; writing the container unit data carrier with the data of scanned containers; and wherein the apparatus locates the nest locator in order to ensure the right orientation of the support element in the apparatus.

These aspects are merely an illustrative aspect of the innumerable aspects associated with the present disclosure and should not be deemed as limiting in any manner. These and other aspects, features and advantages of the present disclosure will become apparent from the following detailed description when taken in conjunction with the referenced figures.

BRIEF DESCRIPTION OF THE DRAWINGS

Further features and advantages of the present disclosure will become more apparent from the description of a preferred but non-exclusive embodiment of a method and a apparatus for managing containers according to the present disclosure, illustrated by way of non-limiting example in the accompanying drawings, in which.

The elements or parts of elements that the embodiments described in the following have in common will be indicated by the same reference numerals.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

In the following detailed description numerous specific details are set forth in order to provide a thorough understanding of the present disclosure. However, it will be understood by those skilled in the art that the present disclosure may be practiced without these specific details. For example, the present disclosure is not limited in scope to the particular type of industry application depicted in the figures. In other instances, well-known methods, procedures, and components have not been described in detail so as not to obscure the present disclosure.

The headings and sub-headings used herein are intended only for general organization of topics within the present disclosure and are not intended to limit the disclosure of the technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. All references cited in the "Detailed Description" section of this specification are hereby incorporated by reference in their entirety.

Figures 1, 2:
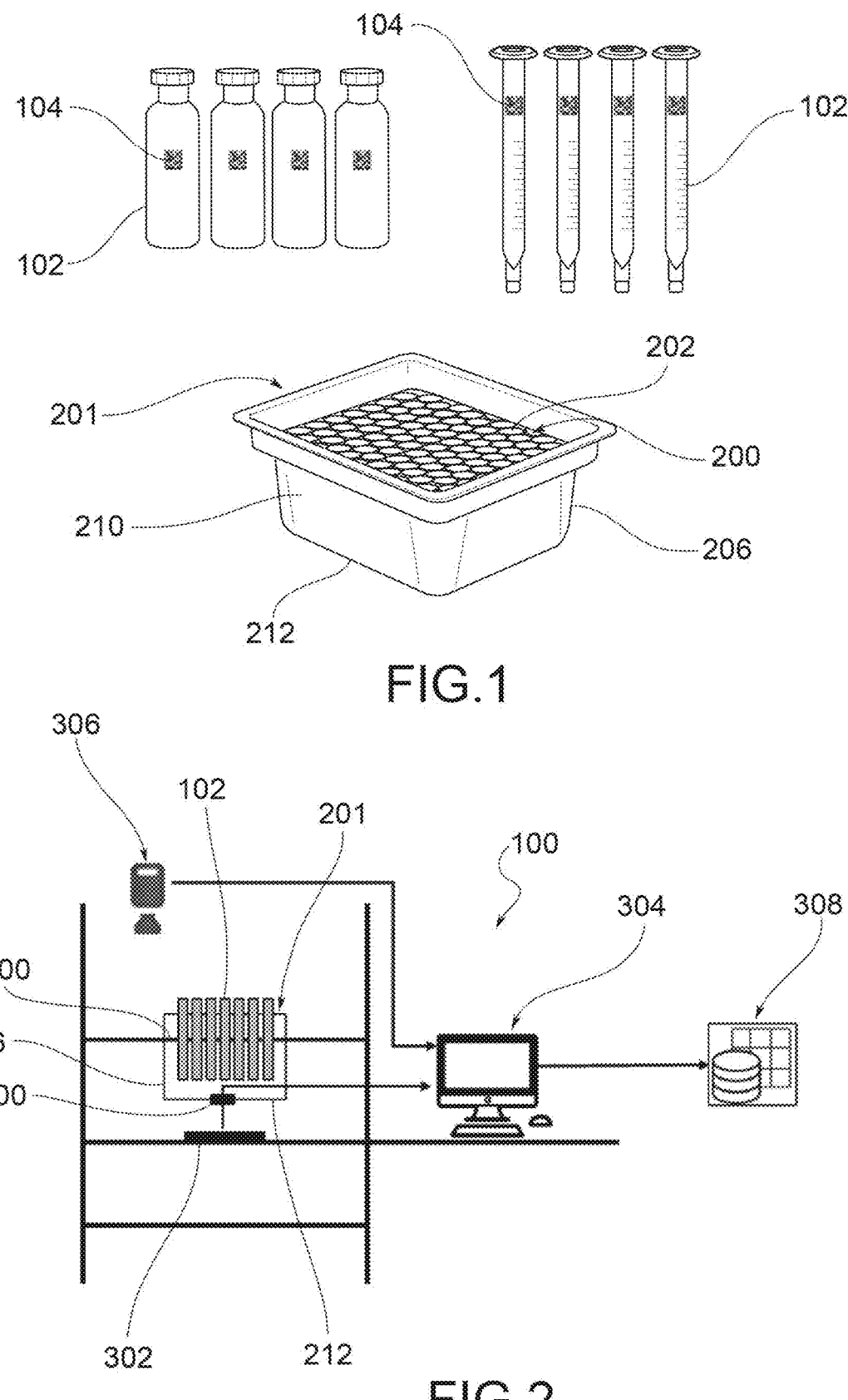
FIG. 1 is a schematic view of containers, nest and tub according to an embodiment of the present disclosure.
FIG. 2 is a schematic view of an apparatus according to an embodiment of the present disclosure.

FIG. 1 shows a container unit 201 for handling containers 102 according to the present disclosure.

The container unit 201 comprises a support surface 202 arranged with a plurality of seats 204, each of the seats 204 being adapted to contain a container 102.

Each container 102 is provided with a container data carrier 104 adapted to contain a unique identifier of the container 102.

The container unit 201 comprises at least one container unit data carrier 300 adapted to contain data of the containers 102 contained in the seats 204, said data comprising the unique identifiers of each container 102, and the position of each container 102 in the seats 204.

Figures 5, 6:
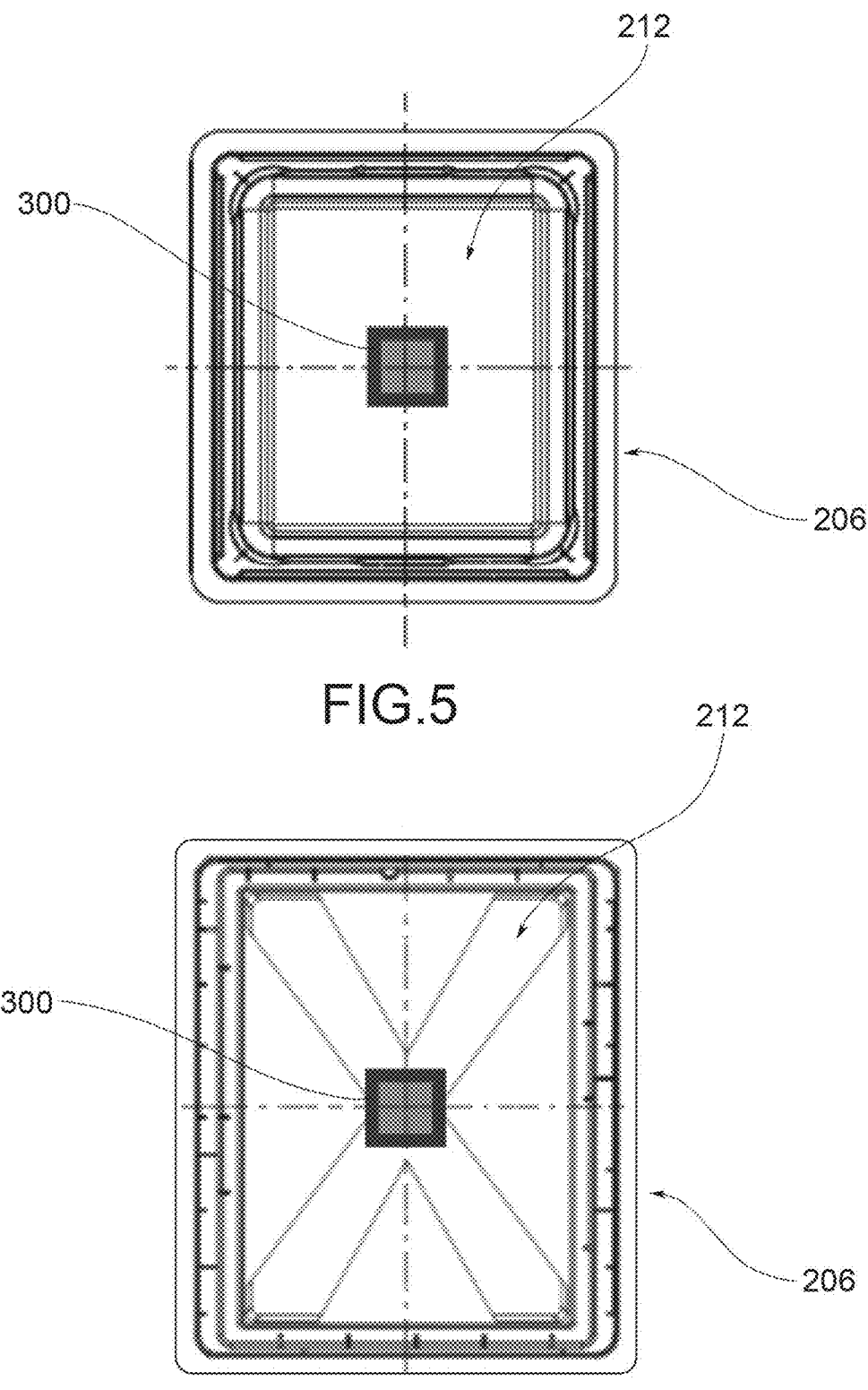
FIGS. 5 and 6 are schematic views of tubs according to embodiments of the present disclosure.
Figure 7:
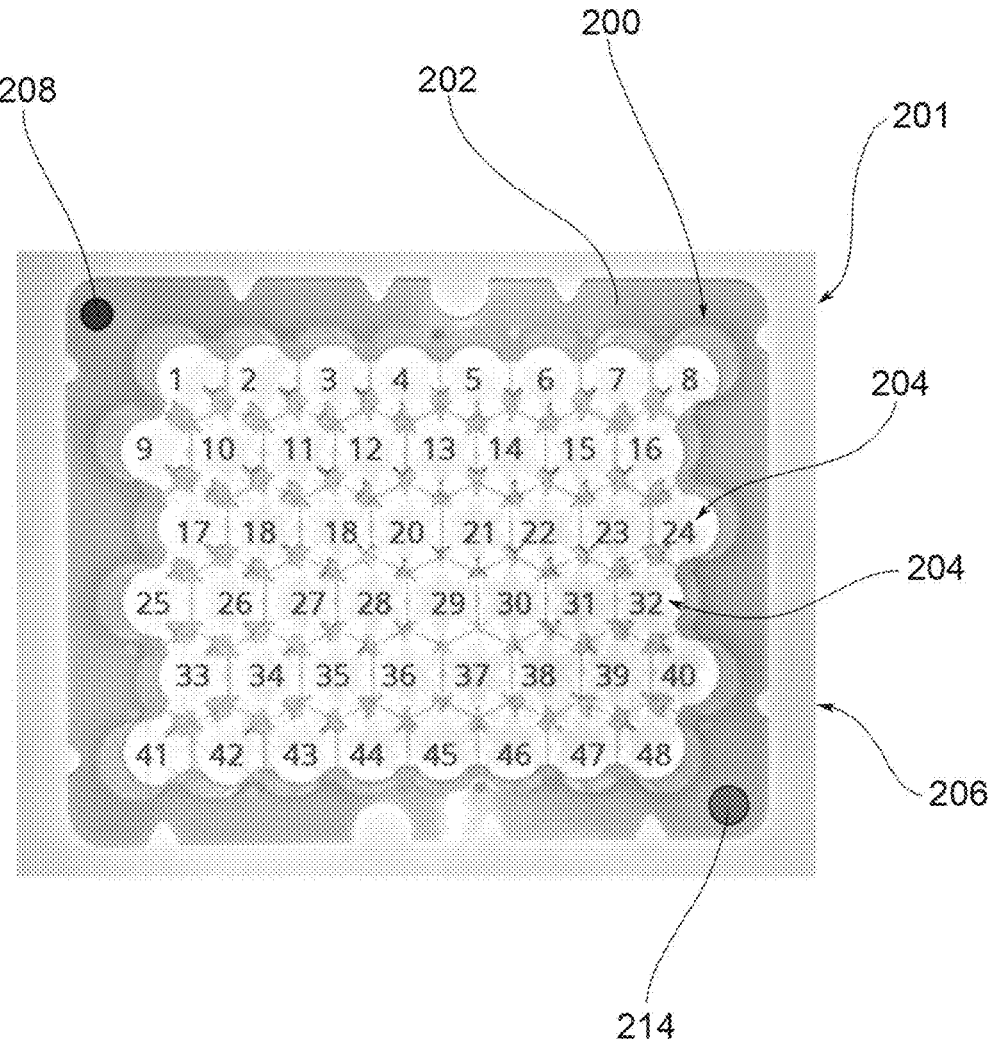
FIG. 7 is a schematic view of nest and tub configuration according to an alternative embodiment of the present disclosure.

According to a possible embodiment, the at least one container unit data carrier 300 may be provided on a bottom wall 212 of the container unit 201. Preferably, as it can be seen in FIGS. 5 and 6, the at least one container unit data carrier 300 may be provided on the bottom wall 212 in a central position with respect to the perimeter of the bottom wall 212.

The at least one container unit data carrier 300 is adapted to be read and written with data.

In particular, the at least one container unit data carrier 300 may be a bi-dimensional barcode, an electronic chip or a memory device. Preferably, the at least one container unit data carrier 300 may be a RFID or NFC type chip. Moreover, the container unit data carrier 300 may be any information carrier allowing the modification of its information content.

According to a possible embodiment, the container unit 201 may comprise at least one container (102) The container data carrier 104 may be adapted to contain data comprising the unique identifier of the container 102, and the position of each container 102 in the seats 204.

The specifications of the unique identity may be based upon agreed specifications, published guidance documents, international specifications or regulatory requirements.

According to a possible embodiment, the unique identifier can be delivered for example by the computerised control systems 304, data carriers, or can be received or uploaded from an external system (not shown).

According to a possible embodiment, the container data carrier 104 may be for example a bi dimensional bar code, in particular a QR code.

The container data carrier 104 may be applied to each container 102 via a marking process as for example laser, inkjet or other related marking process, which are able to provide variable data strings and two dimensional barcode images. According to alternative embodiments, the container data carrier 104 can also be added to the container 102 via a third-party component such as an electronic or semiconductor based data carrier which becomes associated with the container 102, for example during the manufacturing process.

As mentioned above, the containers 102 may be manufactured from glass, plastic, rubber, be multi-material assemblies or other suitable materials and may contain a container data carrier 104 as part of a component or an assembly.

Advantageously, container data carrier 104 may be adapted to be machine-readable using camera systems, electronic readers (RFID or NFC) or other reading devices which may be needed to ensure automatic readability within a production environment.

The unique identity contained in the container data carrier 104 may be stored in the computer control system 304 as a digital data string, electronic files along with any specific data in order to create a parent and child relationship between the different aggregation levels.

According to the present disclosure, the container unit 201 comprises a nest locator 208 provided on its surface, adapted to be the reference for mapping the position of the containers 102 in the seats 204. The nest locator 208 may be a machine-readable code.

According to a possible embodiment, the nest locator may be a bi-dimensional bar code, and/or a text component so as to be machine and/or human readable.

The container unit 201 may comprise:

a support element 200 provided with the support surface 202 arranged with the plurality of seats 204; and a tray 206 adapted to be associated with said support element 200 for handling said support element 200 and the containers 102.

According to a possible embodiment, the tray 206 may comprise side walls 210 and a bottom wall 212.

The container unit data carrier 300 may be provided on said support element 200 or on said tray 206.

The container unit data carrier 300 should be placed in a position that facilitates the readability whilst at the same time not affecting the operation or sterility of any machines that are using the apparatus according to the present disclosure. Equally, the position of the container unit data carrier 300 may be defined by different stakeholders whilst still enabling compliance with the process requirements.

The container unit data carrier 300 is used as a method to facilitate the transfer data between different machines.

According to a possible embodiment, the container unit data carrier 300 may be adapted to be read and written with data sets in a defined method. As an example, the container unit data carrier may be adapted to contain data relating to: manufacturer, production date, batch number, supplier code, production time, unique identifier position, number of objects, line number, nest locator, object type, object dimension, container unique identifier code.

According to a possible embodiment, the support element 200 may comprise the nest locator 208.

As mentioned above, the containers (102) may be made of glass or polymer. Moreover, the containers 102 may be a vial or a cartridge with or without a closure system, or a syringe with or without a needle shield, a needle safety device or a luer lock cap.

FIG. 2 shows an embodiment of an apparatus for managing containers 102 according to the present disclosure. The apparatus 100 comprises:

a container unit 201 a reading device 302 adapted to read the data contained in the container unit data carrier 300; and a computerized control system 304, operatively connected to the reading device 302, adapted to receive the data of the container unit data carrier 300 from the reading device 302.

According to a possible embodiment, the nest locator 208 may be adapted to be used by the a computerized control system 304 as a zero point, using a matrix method where the seats 204 are divided in columns and rows, in which the nest locator 208 is adapted to define a first column and a first row, each seat 204 being defined by a row number, and a column number.

This method is the preferred method as most of the machines using ready to use configuration, process the nest in rows. The activity required for each unique identifier/container is completed by the machine/process before indexing to the next row.

According to an alternative embodiment, the computerized control system 304 is adapted to define the position of the seats 204 by counting the seats 204 starting from the seat 204 nearest to the nest locator 208, counting from one side to the other along a row, and when the row has been completed, the sequence continued with a next row.

Figure 3:
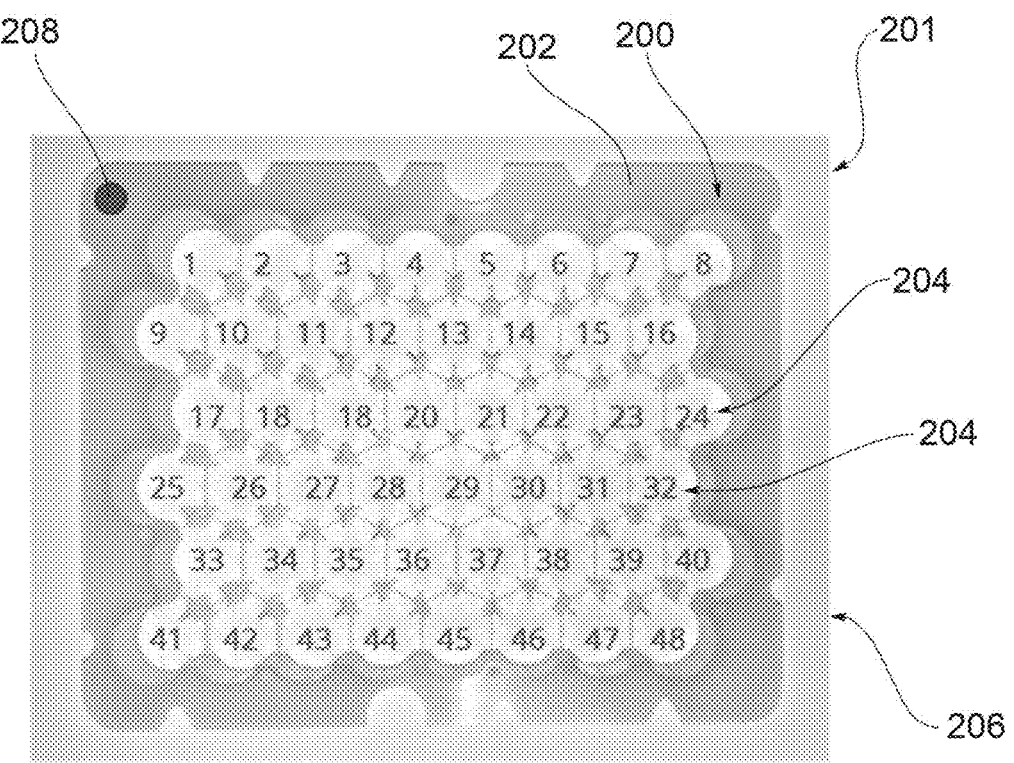
FIGS. 3 and 4 are schematic views of nest and tub configurations according to alternative embodiments of the present disclosure.

With reference to the example of FIG. 3, the position of the container may be defined as a unique position number when the count is made from the position of the nest locator 208 which is located on the top left-hand corner of the nest. In this case the positions will be counted as a sequence moving left to right along the first row. When row has been completed the sequence will be continued in the same manner within row two—moving left to right. This method defines each position as a unique number.

According to a possible embodiment, the nest locator 208 may contain a bi-dimensional barcode, although it may be also located in an image by means of its color, shape or a different visual mark.

In an alternative embodiment, the nest locator 208 may contain a bi-dimensional barcode and a text component. In this way, the nest locator may be both machine and human readable as a fail-safe prevent errors and facilitate human intervention when needed or to indicate the correct "zero position" when the nest may be printed with more than one "nest locator". As a matter of fact, in some manufacturing line the nest may be rotated during the process.

According to a possible embodiment, the tray may comprise a second nest locator 214, adapted to be used as an end point.

The apparatus 100 may comprise a first camera reader 306 operatively connected to the computerized control system 304, adapted to read a nest locator 208 provided on said container unit 201, in order to map the position of the containers 102.

According to a possible embodiment, the apparatus may comprise a second camera reader 306 operatively connected to the computerized control system 304 adapted to read the unique identifier of the containers 102.

According to a possible embodiment, the container data carrier 104 of each container 102 may comprise a RFID chip. In this case, the second camera reader 306, operatively connected to the computerized control system may be substituted or complemented by a device able to read and/or write the RFID chip. Regardless of the type of reader used to read and possibly read/write the information carried by the container data carrier 104, at least one reader may be used to locate and/or identify both the nest locator and the container data carrier 104.

The configuration of the apparatus depends on the product type, the packaging and the manufacturing specifications required. In particular, it may be integrated within the container manufacturing lines, or be designed as a separate product management station running in parallel to the manufacturing line.

When the apparatus is designed as a separate product management station, the product will be moved from one line to another once the relevant process steps have been completed.

The apparatus of the present disclosure is adapted to manage higher levels of aggregation as part of the process such as container unit 201 to shipper and shipper to pallet etc., in line with customer or industry wide specifications. The higher level of aggregation will use the same method of creating an electronic association between the higher levels of packing using data carriers.

As an example, the shipper may be provided with a specific unique identifier, that can be associated with the container unit data carrier of the associated tray, nest locator, and the containers unique identifier.

The apparatus according to the present disclosure may operate as a standalone unit or be integrated with an automated production process, such as a container manufacturing line. In this regard, the computerized controlled system 304 of the apparatus may be a standalone system, or may be integrated as a software in the main computerized control system of the manufacturing line.

In particular, the main computerized control system of the manufacturing line may be adapted to continue to work in conjunction with the process management system. During the process, embedded software systems and algorithms, specifically designed for the process will manage and coordinate process and share data in both directions across the different levels and pieces of equipment.

During the manufacturing process, data may be added to the container data carrier, and/or to the container unit data carrier associated with the tray, and they may be adapted to be stored in the computerized control system of the apparatus or in the main computerized control system of the manufacturing line. As an example, this data can be the batch number, the identity, the unique identifier, the position, status changes and aggregation relationships.

According to a possible embodiment, the container data carrier 104 and the container unit data carrier 300 are not adapted to physically contain all the necessary data, but they may be associated with a memory, for example on the computerized controlled system, wherein these data are available. In this specific case, the container data carrier 104 and the container unit data carrier 300 may be for example an optical code such as a barcode or a QR code.

According to a possible embodiment, the data may be generated, uploaded and stored in a corporate level system 308, designed to be the overall data management and control system. The corporate level system may be designed to enable data sharing with other computer systems. Data sharing can be done via a variety of file formats and this may include, but is not limited to XML, JSON, EPCIS messaging etc.

Corporate level system 308 may be structured in a manner which facilitates compliance with any relevant international standards and mandates which may be required by external authorities. This may include access controls and other security features to ensure data integrity and security.

The status, readability, image, unique identifier or any other relevant parameters may be updated in the corporate level system 308 and stored for later usage.

Any changes of status at any point in the process may be added to the existing data managed or may be stored so that it is possible to see a full history of the product during its lifetime. This data may be uploaded or transferred to external computer systems.

Additional functionality may be added to the corporate level system 308 to enable external messaging, alerts and notifications, reporting, tracking and tracing shipments etc.

As mentioned above, the apparatus may be adapted to create an electronic relationship between the components, nest, tub, shippers, or higher aggregation levels within the bulk container manufacturing process or the ready to use process, which delivers pre-sterilized products direct to aseptic process machines, line or systems.

In the case of bulk packaging, the apparatus may be adapted to create a specific electronic relationship between the unique identifier of the container and the different levels of the packaging hierarchy such as container 102 to container unit 201, container unit 201 to shipper, shipper to pallet, etc. The access to the aggregation structure may be delivered for example via URL access, system integration and data exchange or a data carrier.

It will be now described a possible method for managing containers with an apparatus according to the present disclosure.

The method in its essential form comprises the steps of:
a) providing the apparatus 100 with a container unit 201;
b) scanning the container data carrier 104 of each container 102 contained in the container unit 201;
c) writing the container unit data carrier 300 with the data of scanned containers 102; wherein before step b) the apparatus locates the nest locator in order to ensure the right orientation of the nest in the apparatus.

Figure 4:
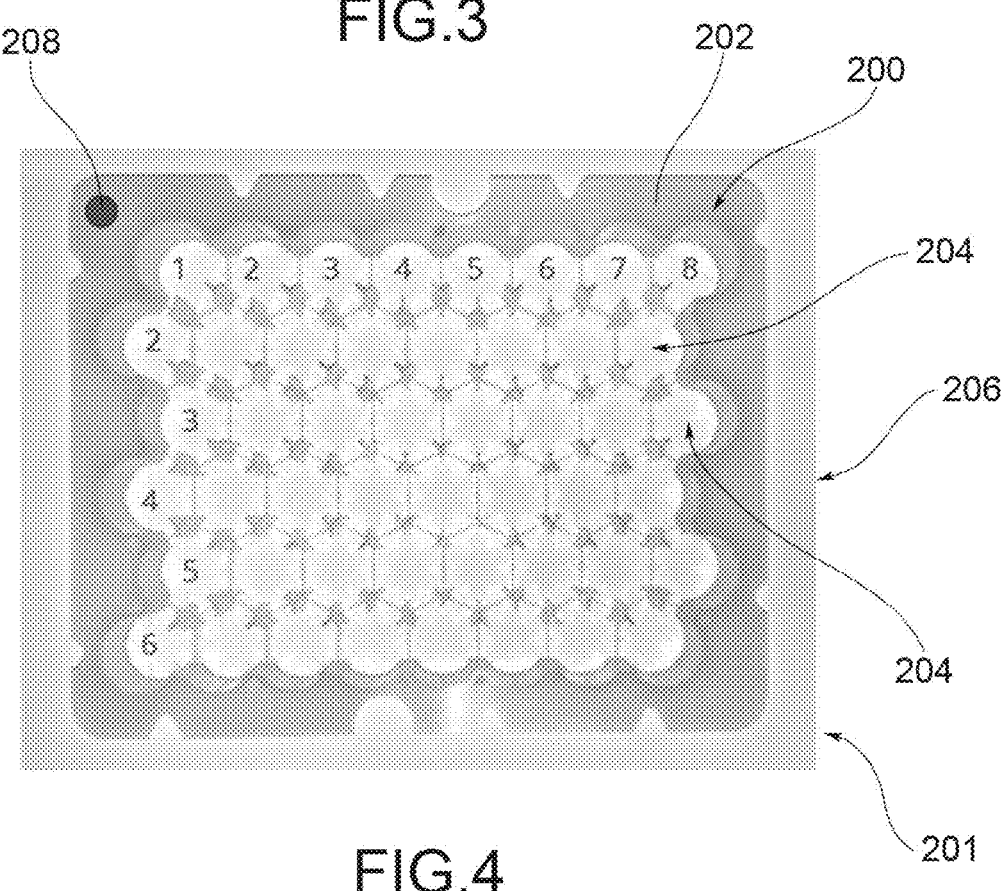

According to a possible embodiment, depicted in FIG. 4, the nest locator 208 may be used as a zero point in the removing operation, using a matrix method where the seats are divided in columns and rows, in which the nest locator 208 is adapted to define a first column and a first row. In this method each seat will be defined by row number, and a column number.

According to an alternative embodiment, the position of the seats 204 are defined by counting the seats 204 starting from the seat 204 nearest to the nest locator 208, counting from one side to the other along a row, and when the row has been completed, the sequence continued with a next row.

According to a possible embodiment, after step c) the support element 200 may be provided inside the tray 206, and support element 200 and tray 206 may be sealed together.

Moreover, the method may comprise other steps such as:
removing each container (102) from its seat before scanning the container data carrier;
writing batch data on the tub;
placing the sealed tub in a sterilized bag; and
placing the sealed unit in a shipper.

The advantages that can be achieved with the present disclosure are clear.

First of all, the apparatus and the method of the present disclosure make it possible to simplify readability of the container unique identifier passing through the filling machine.

Furthermore, it is possible to overcome the machine nest orientation challenges by defining a zero point on the nest.

Once again, it is possible to pass product and supplier data to the filling line to increase product traceability.

Moreover, the aggregation process will create an electronic association between the nest, each individual UID/container, its position in the nest and any production data associated with manufacturing process.

The nest and tub aggregation process may be part of ready to use manufacturing process which requires the process steps to be carried out in a clean room of a designated class. All the components associated with the system are maintained within a specific set environmental conditions temperature which follow internal norms or standards such as International Standards Organization (ISO). This may be done as a complete unit or as separate components within the manufacturing line.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

The invention claimed is:

1. A container unit for handling containers, comprising:
a support element provided with a support surface arranged with a plurality of seats, each of said seats being adapted to contain a container, each container being provided with a container data carrier adapted to contain a unique identifier of the container;
a tray adapted to be associated with said support element for handling said support element and the containers;
at least one container unit data carrier adapted to contain data of the containers contained in the seats, said data comprising the unique identifiers of each container, and the position of each container in the seats;
a nest locator provided on the support surface of the support element and adapted to be the reference for mapping the position of the containers in the seats; and
wherein said nest locator is configured to be identified by a first camera reader in order to map the position of the containers.

2. The container unit according to claim 1, wherein said at least one container unit data carrier is provided on a bottom wall of the container unit.

3. The container unit according to claim 2, wherein said at least one container unit data carrier is provided on the bottom wall of the container unit in a central position with respect to the perimeter of the bottom wall.

4. The container unit according to claim 1, wherein said at least one container unit data carrier is adapted to be read and write with data.

5. The container unit according to claim 4, wherein said at least one container unit data carrier is an electronic chip or a memory device.

6. The container unit according to claim 4, wherein said at least one container unit data carrier is a RFID or NFC type chip.

7. The container unit according to claim 1, further comprising at least one container, wherein the container data carrier is adapted to contain data comprising the unique identifier of the container, and the position of each container in the seats.

8. The container unit according to claim 1, wherein said nest locator is a machine readable code.

9. The container unit according to claim 1, wherein said nest locator is a bi-dimensional bar code, and/or a text component so as to be machine and/or human readable.

10. The container unit according to claim 1, wherein said container unit data carrier is provided on said tray.

11. The container unit according to claim 1, further comprising at least one container made of glass or polymer, said container being a vial or a cartridge with or without a closure system, or a syringe with or without a needle shield, a needle safety device or a luer lock cap.

12. An apparatus for managing containers, comprising:
a container unit according to claim 1;
a reading device adapted to read the data contained in said container unit data carrier; and
a computerized control system operatively connected to said reading device and adapted to receive the data of said container unit data carrier (300) from said reading device.

13. The apparatus for managing containers according to claim 12, wherein the nest locator is adapted to be used by the computerized control system as a zero point, using a matrix method where the seats are divided in columns and rows, in which the nest locator is adapted to define a first column and a first row, each seat being defined by a row number, and a column number.

14. The apparatus for managing containers according to claim 12, wherein the computerized control system is adapted to define the position of the seats by counting the seats starting from the seat nearest to the nest locator, counting from one side to the other along a row, and when the row has been completed, the sequence continued with a next row.

15. The apparatus for managing containers according to claim 12, wherein the first camera reader is operatively connected to the computerized control system.

16. The apparatus for managing containers according to claim 12, further comprising a second camera reader operatively connected to the computerized control system and adapted to read the unique identifier of the containers.

17. A method for managing containers with an apparatus for managing containers according to claim 12, comprising the steps of:
a) providing the apparatus with a container unit comprising a support element provided with the support surface;
b) scanning the container data carrier of each container contained in the container unit;
c) writing the container unit data carrier with the data of scanned containers; and
wherein before step b), the apparatus locates the nest locator by the first camera reader in order to ensure the right orientation of the support element in the apparatus.

18. The method for managing containers according to claim 17, wherein the nest locator is used as a zero point in the removing operation, using a matrix method where the seats are divided in columns and rows, in which the nest locator is adapted to define a first column and a first row, each seat being defined by a row number, and a column number.

19. The method for managing containers according to claim 17, wherein the position of the seats are defined by counting the seats starting from the seat nearest to the nest locator, counting from one side to the other along a row, and when the row has been completed, the sequence continued with a next row.

* * * * *